April 21, 1936. O. R. HAAS 2,037,721
SHOE SEWING MACHINE
Filed Jan. 14, 1933 13 Sheets-Sheet 1
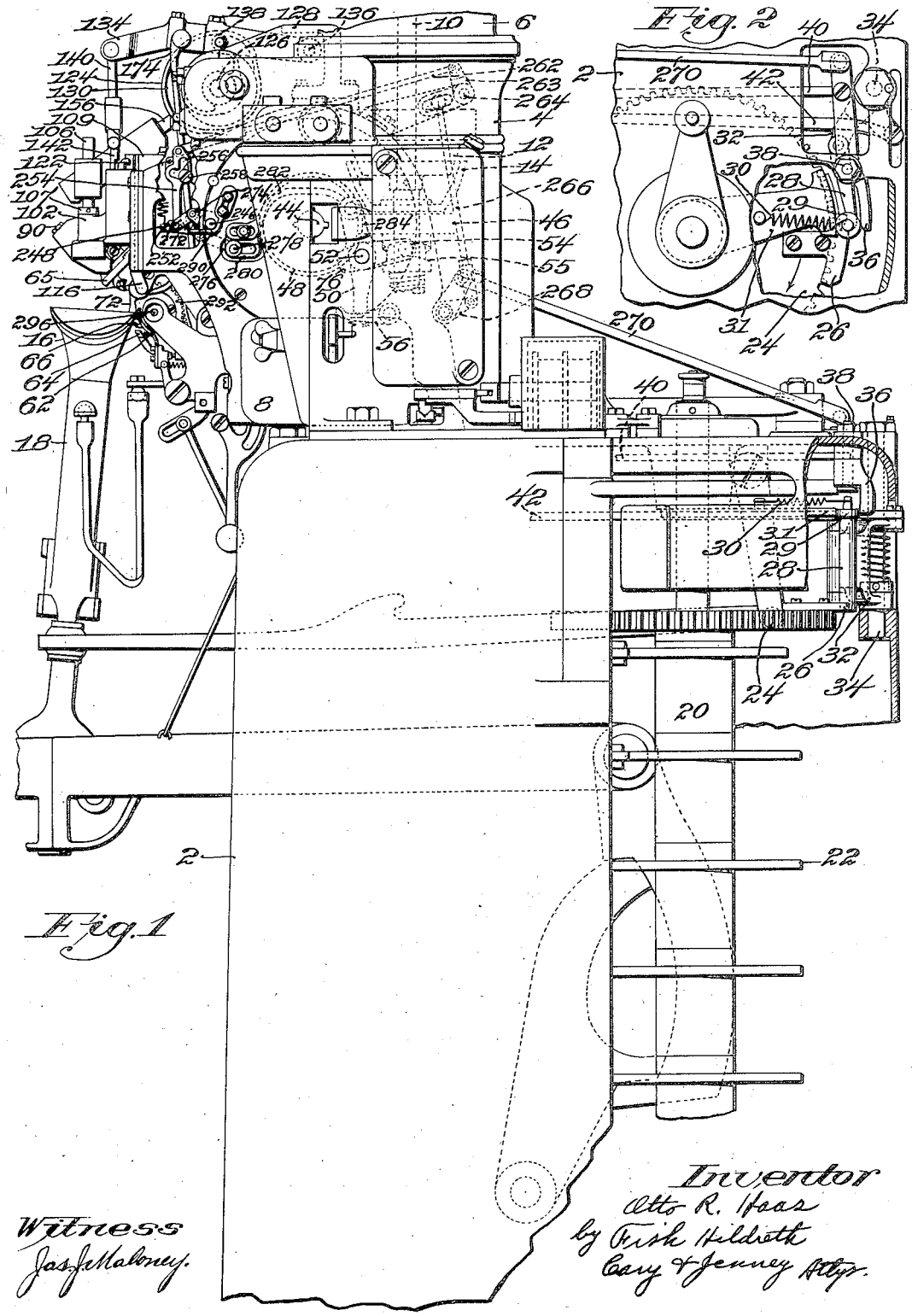

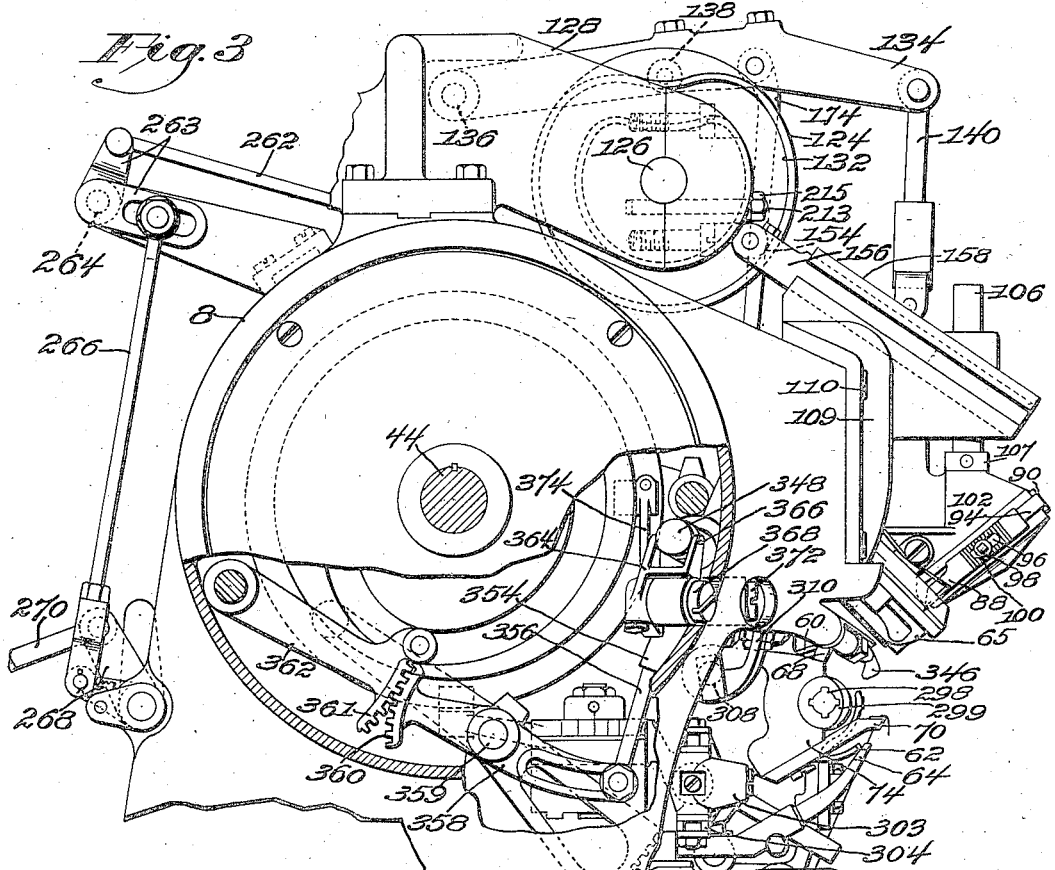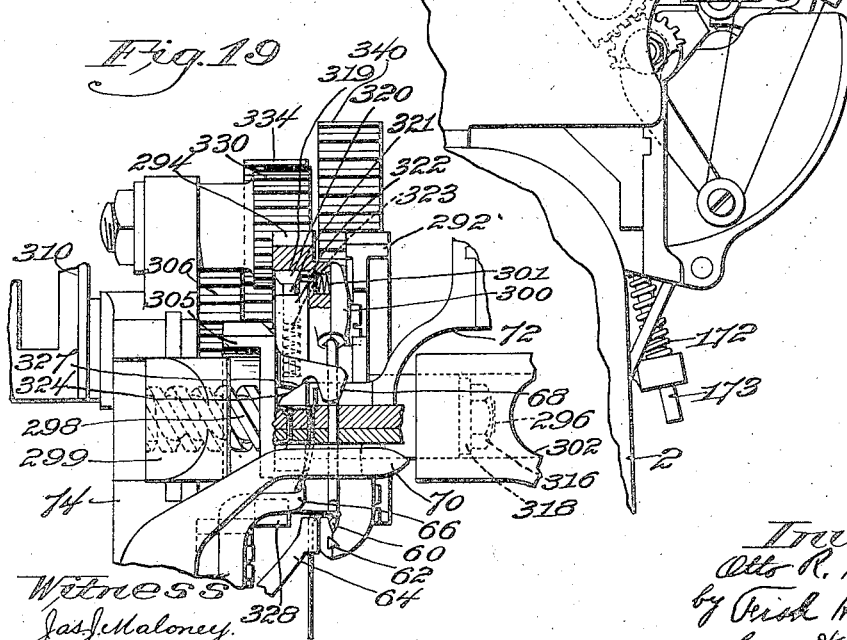

April 21, 1936. O. R. HAAS 2,037,721

SHOE SEWING MACHINE

Filed Jan. 14, 1933     13 Sheets-Sheet 3

Fig. 4

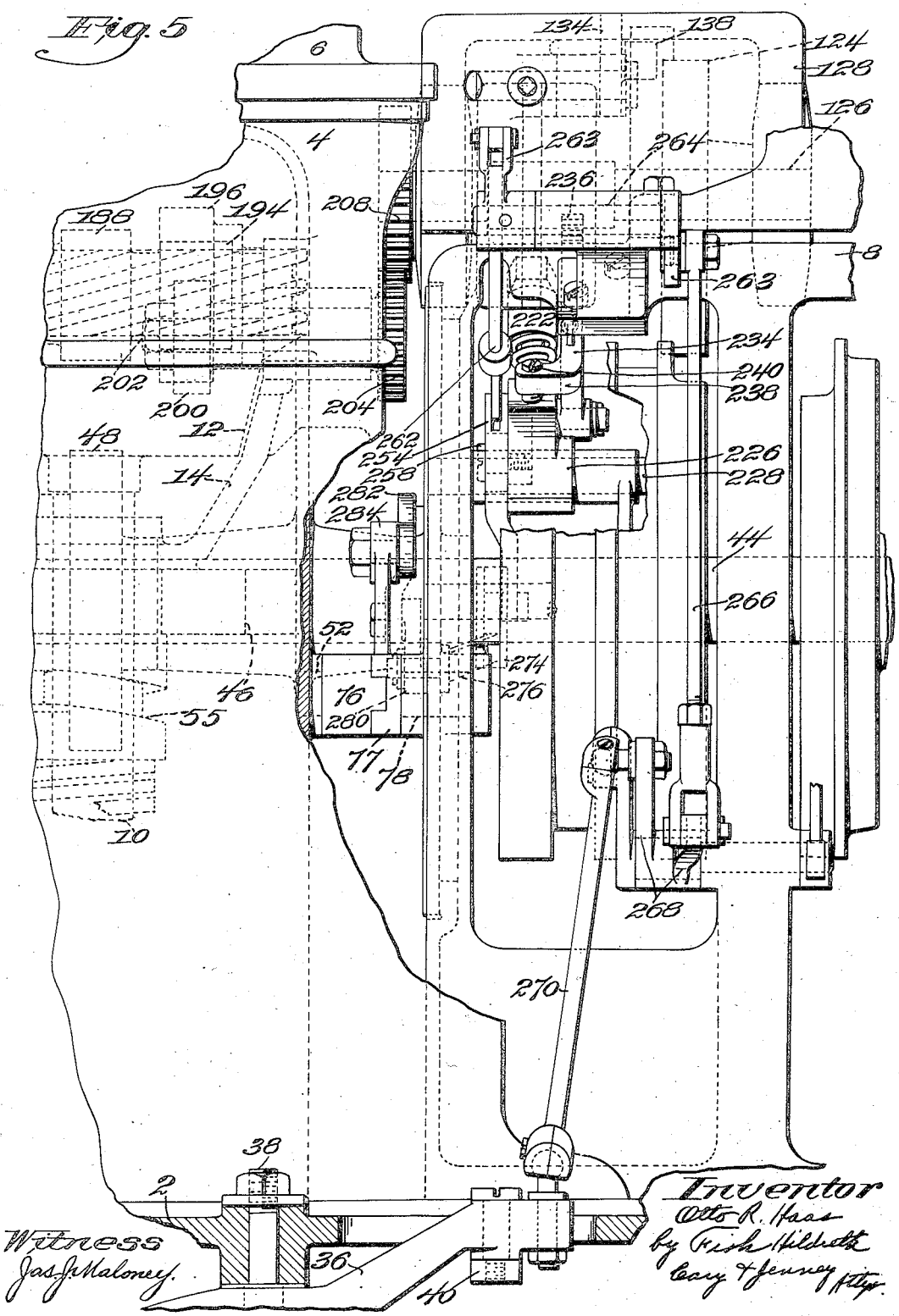

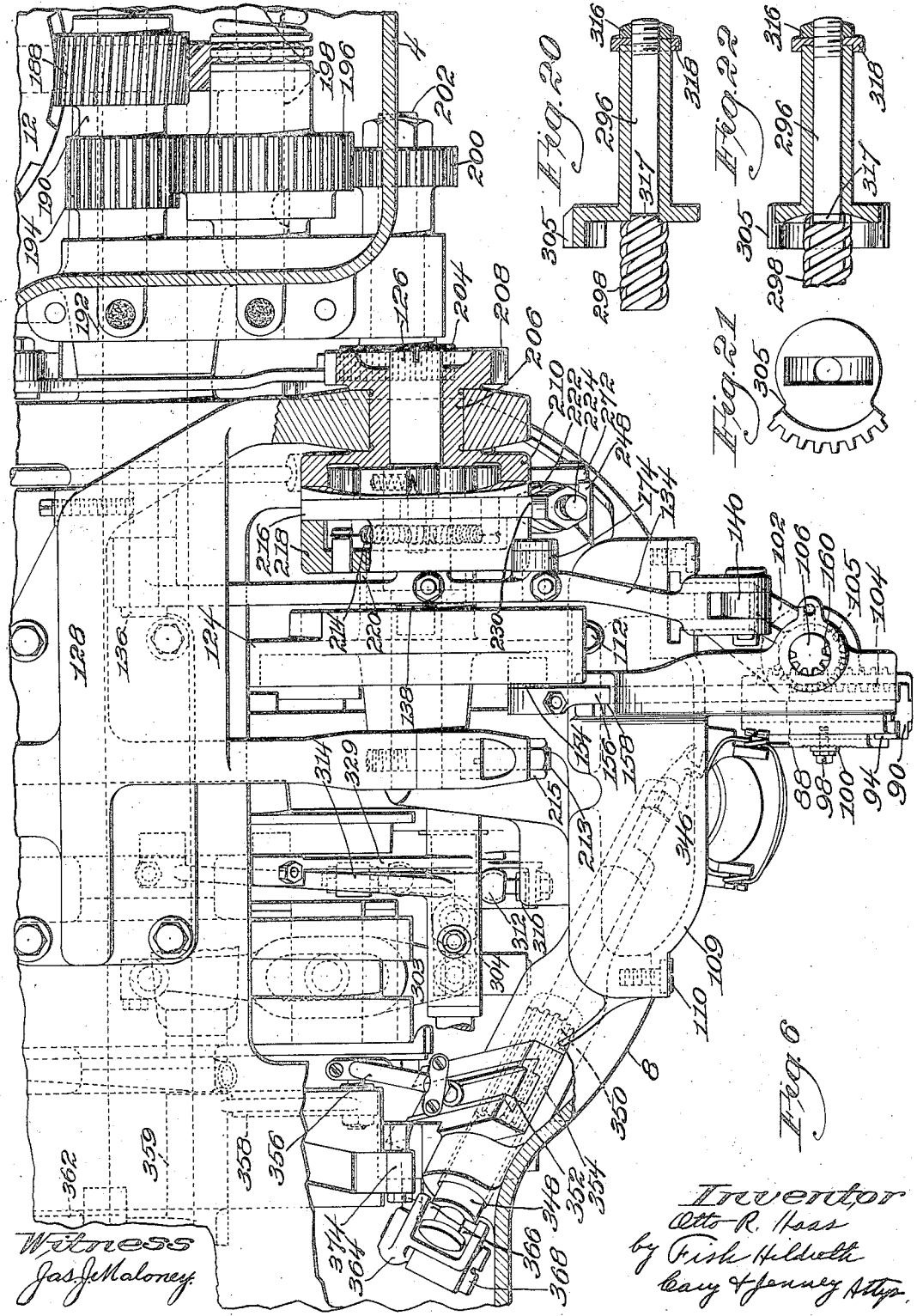

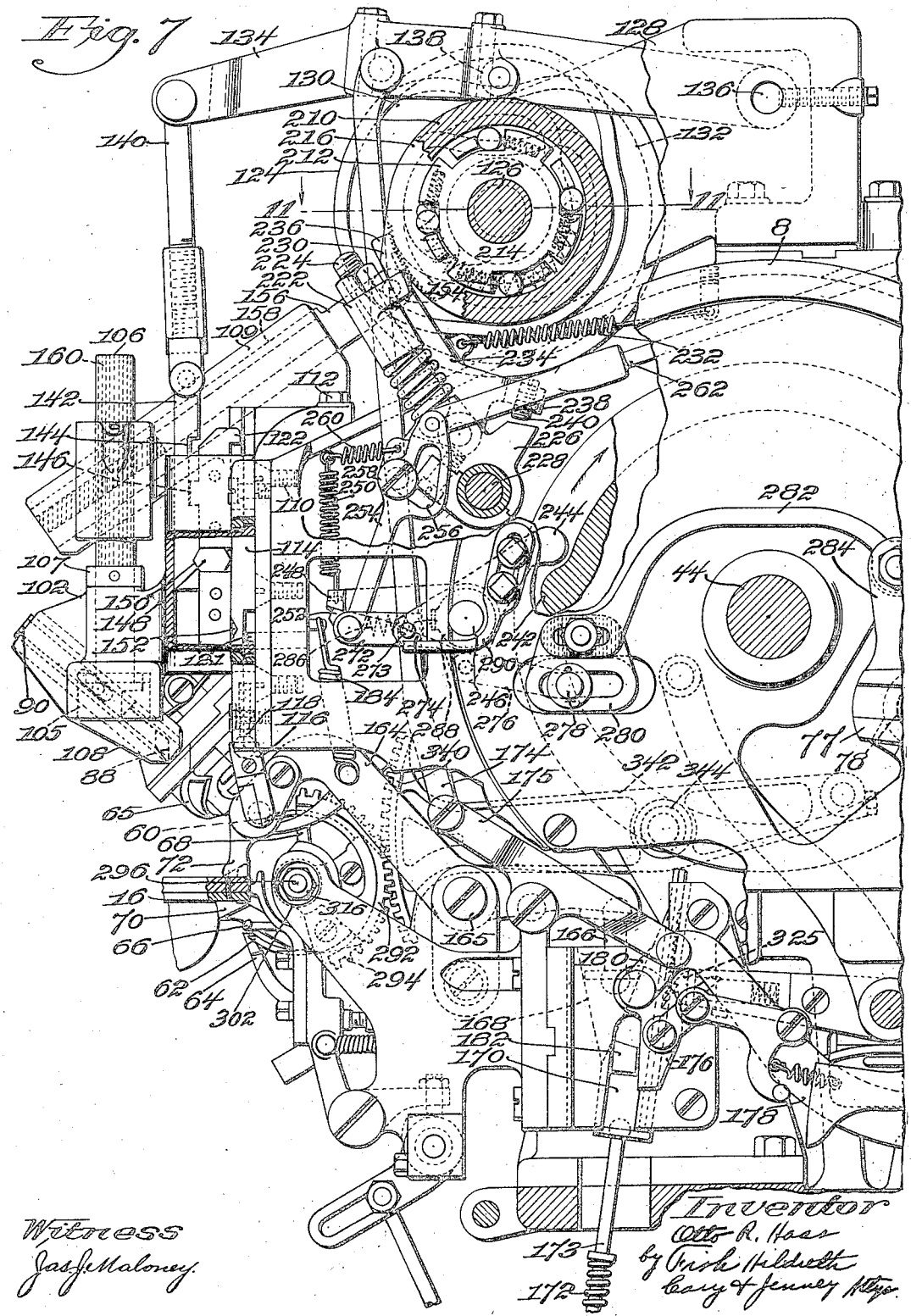

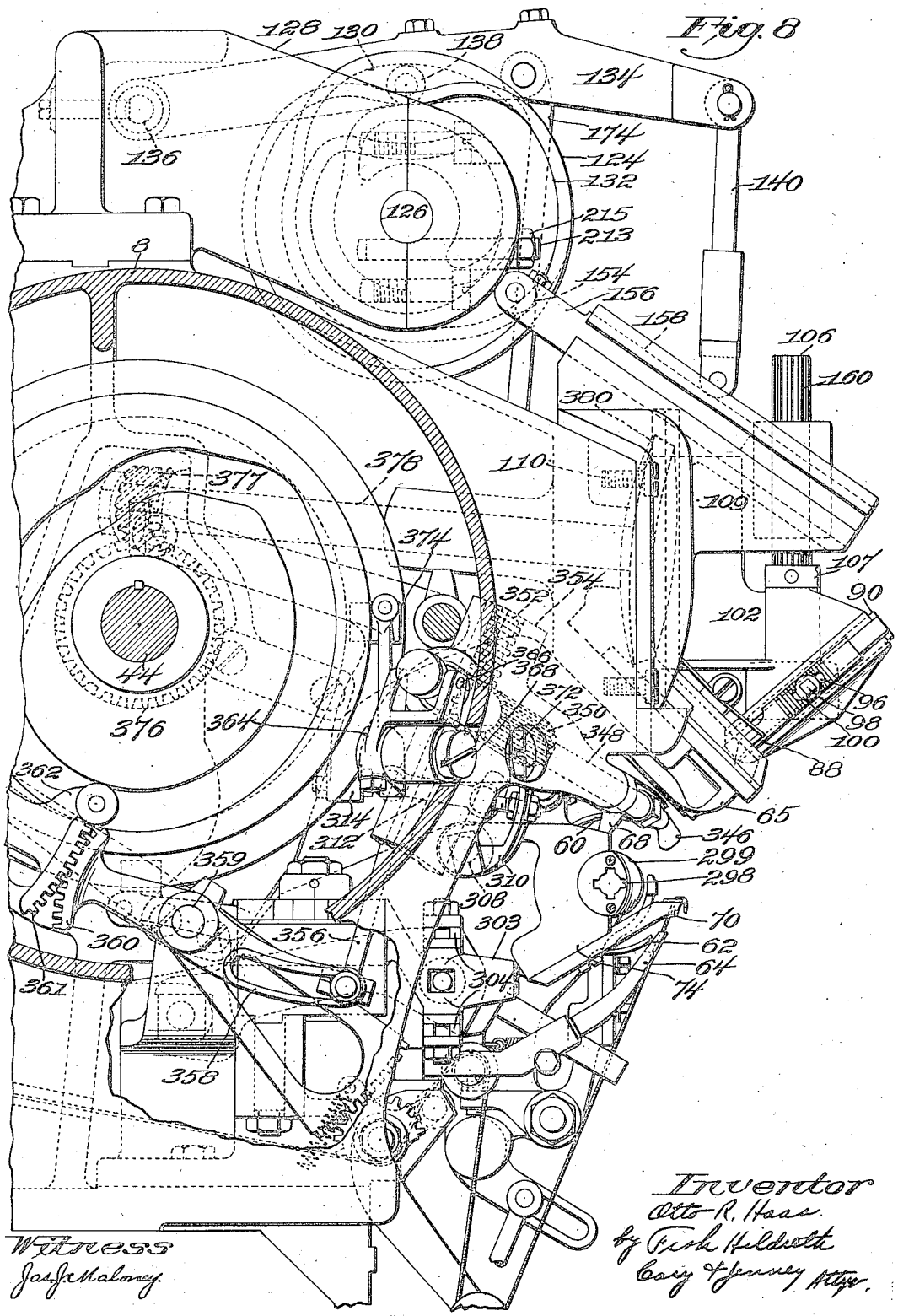

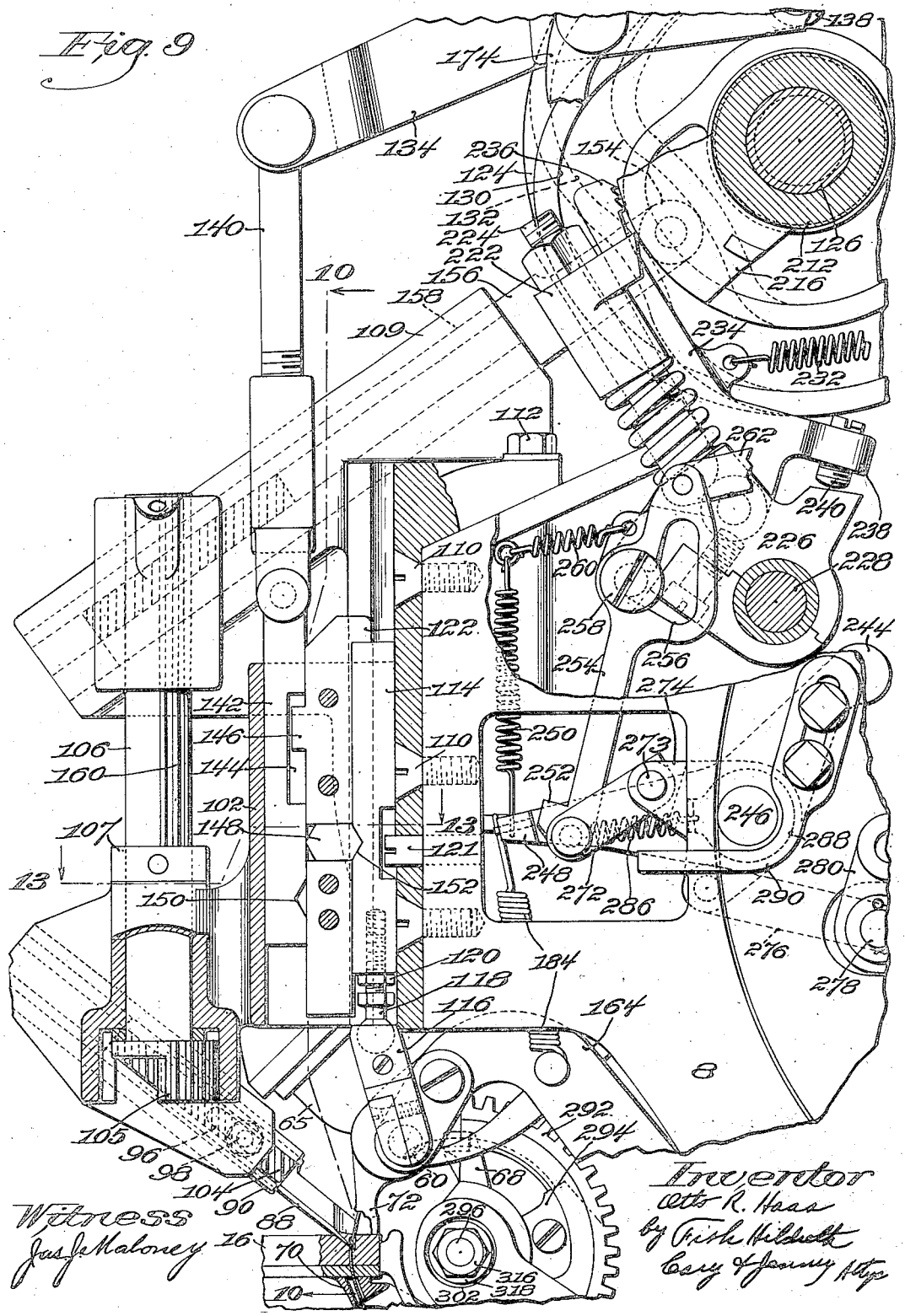

April 21, 1936.                O. R. HAAS                2,037,721
SHOE SEWING MACHINE
Filed Jan. 14, 1933       13 Sheets-Sheet 9
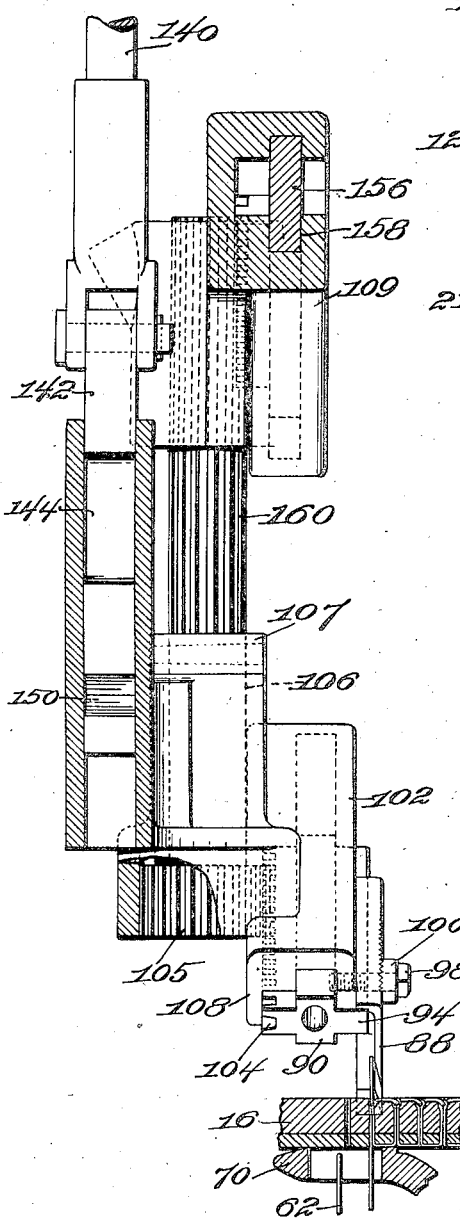
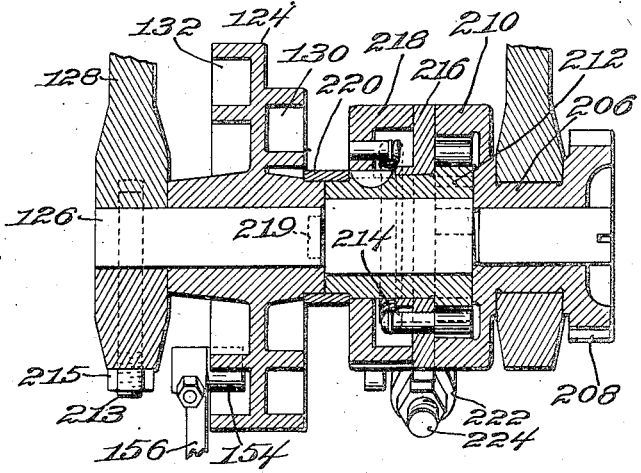
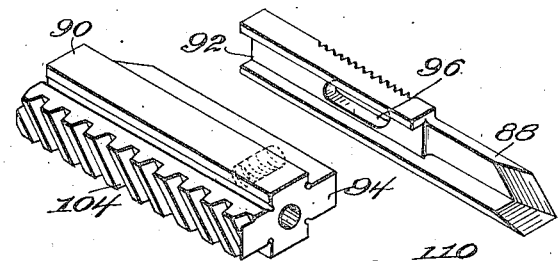
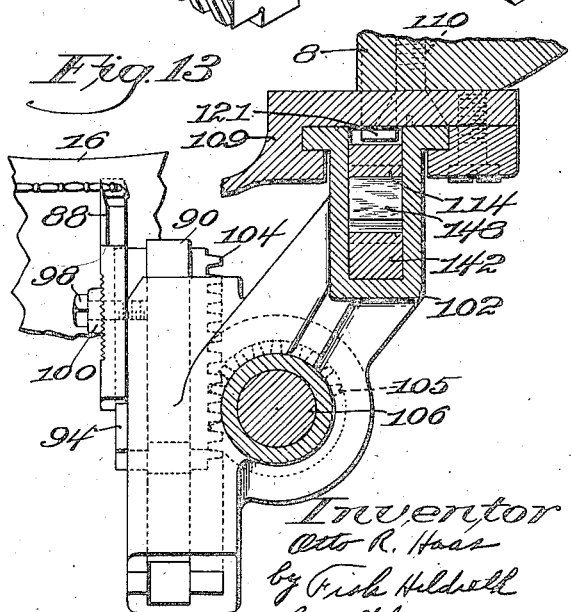

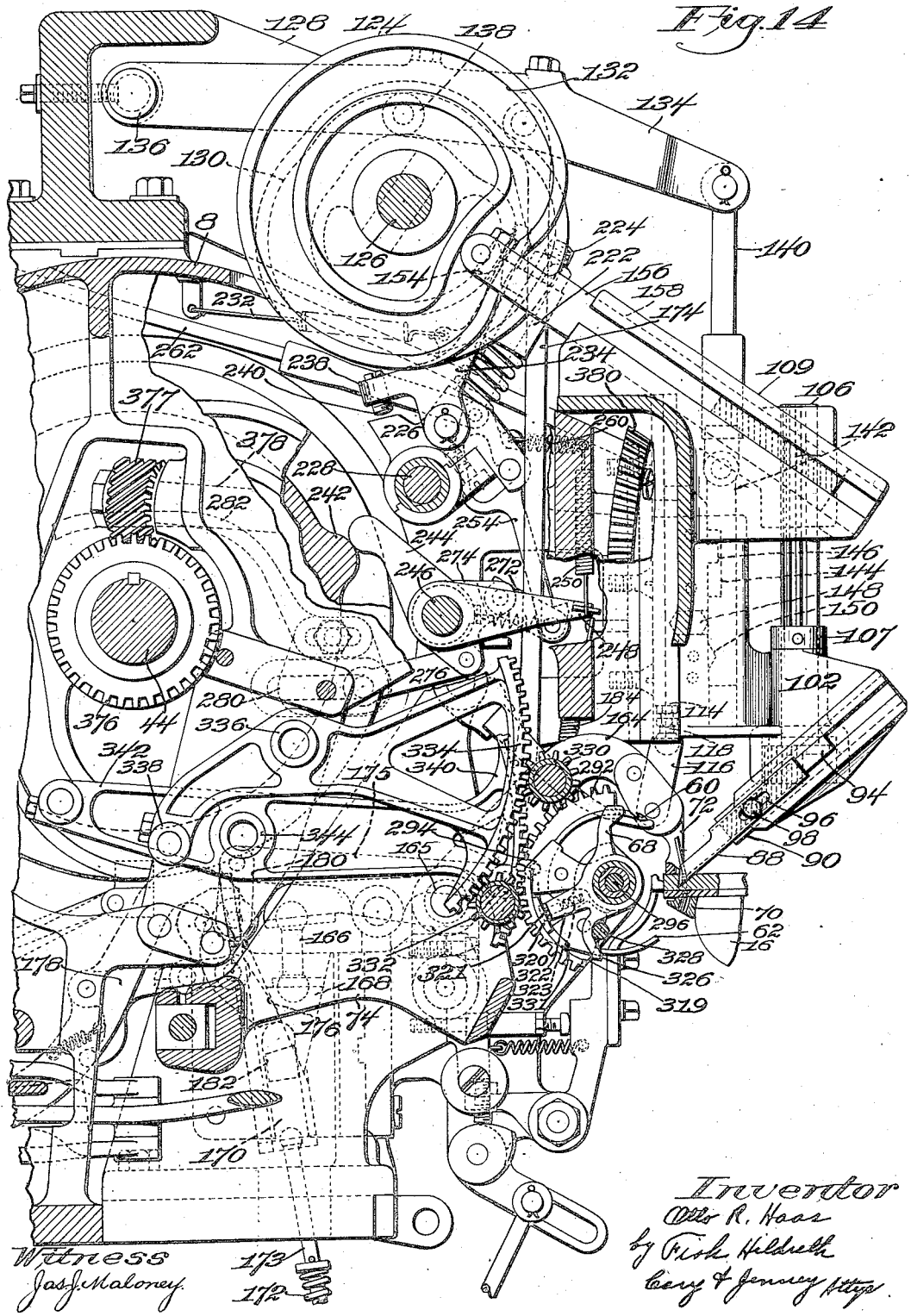

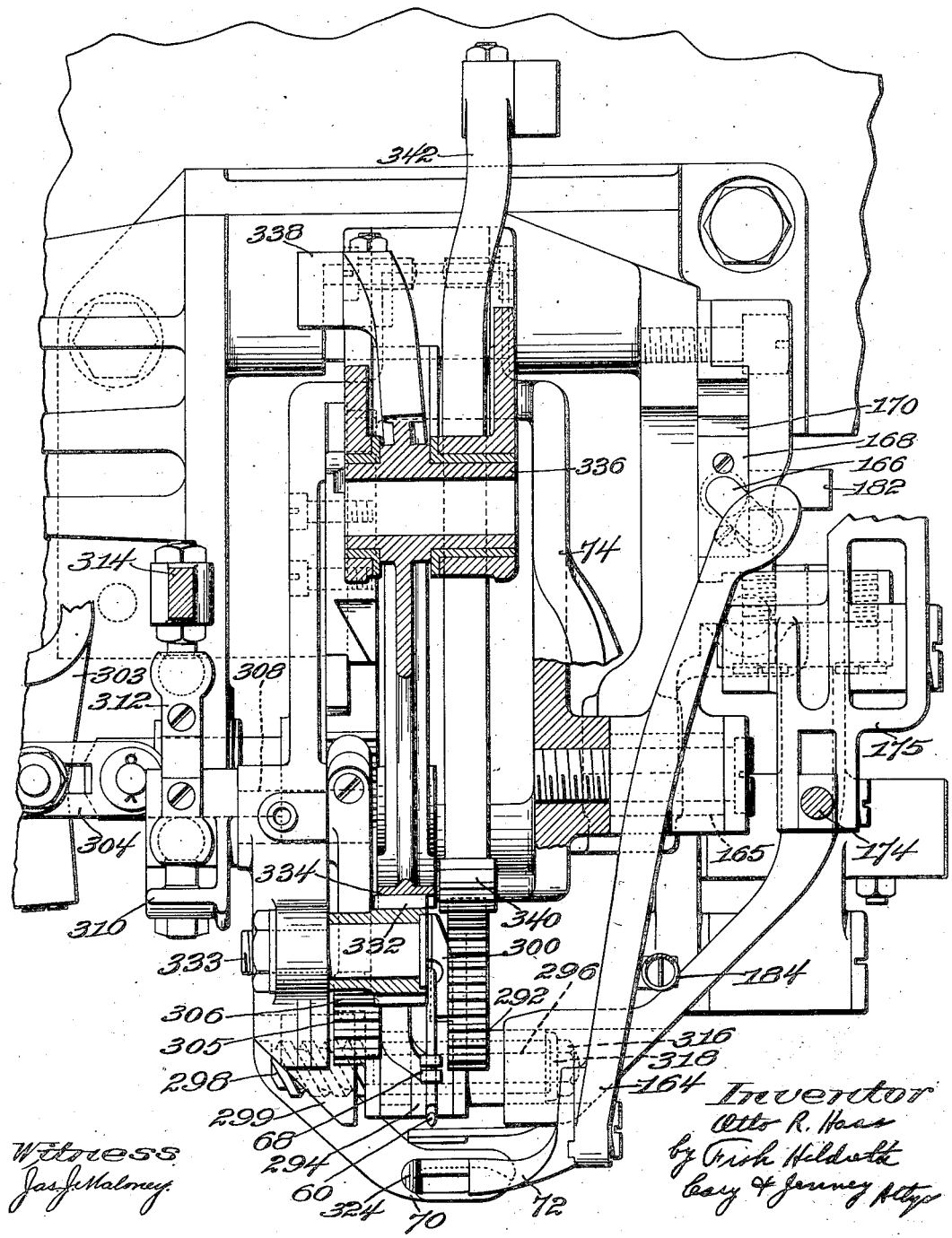

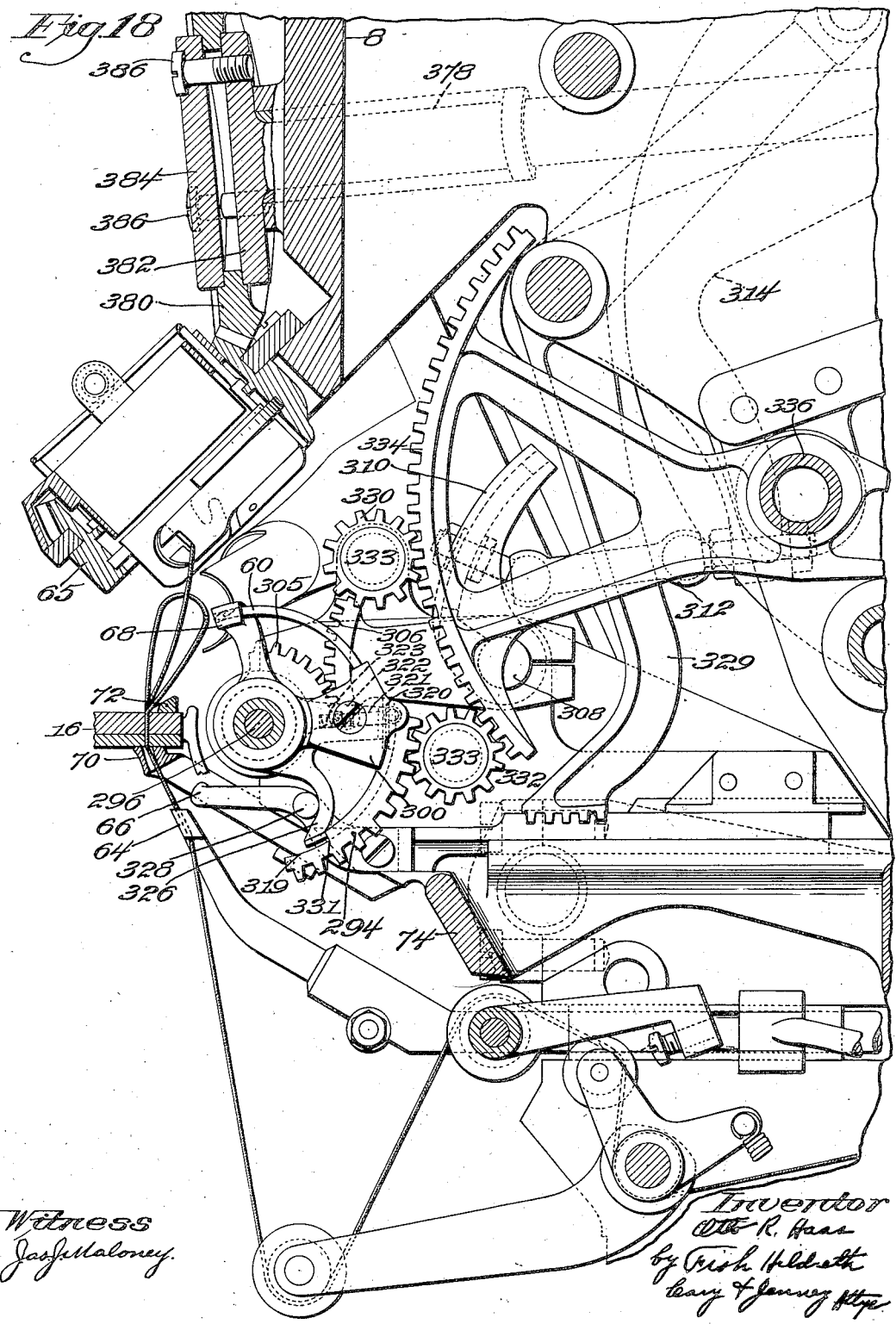

Patented Apr. 21, 1936

2,037,721

UNITED STATES PATENT OFFICE 2,037,721

SHOE SEWING MACHINE

Otto R. Haas, North Beverly, Mass., assignor to United Shoe Machinery Corporation, Paterson, N. J., a corporation of New Jersey Application January 14, 1933, Serial No. 651,803

10 Claims. (Cl. 112—252)

The present invention relates to lockstitch shoe sewing machines for connecting the outsole with the welt, lasted upper and insole of a Goodyear welt shoe.

The invention, as illustrated herein, is embodied in an outsole shoe sewing machine of the type in which the lasted shoe is supported in operative position in the machine by a jack, and all of its movements are effected and controlled by automatically acting mechanisms, although the several features of the invention may be embodied with advantage in machines in which all of the movements are not automatically controlled.

The object of the present invention is to improve the construction, arrangement, and mode of operation of the various parts of outsole shoe sewing machines, both of the automatic type above referred to, and of the type in which the shoe being sewed is held in the hands of the operator.

With the above and other objects in view, as will hereinafter appear, a feature of the present invention contemplates the provision in an outsole shoe sewing machine of a new and improved thread cutting mechanism for severing the needle and locking threads at the end of the seam.

This and other features of the invention, including certain novel and improved constructions and arrangements of parts are hereinafter described in the following detailed specification, and are more particularly pointed out in the appended claims.

Figure 15:
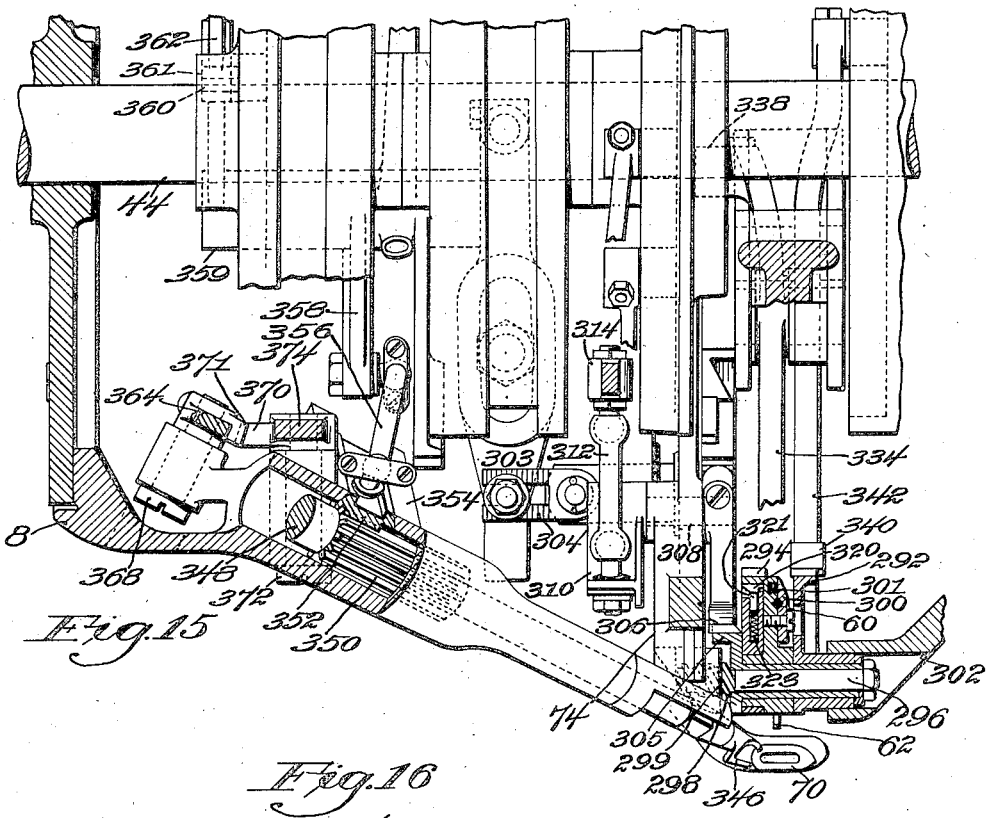
Figure 16:
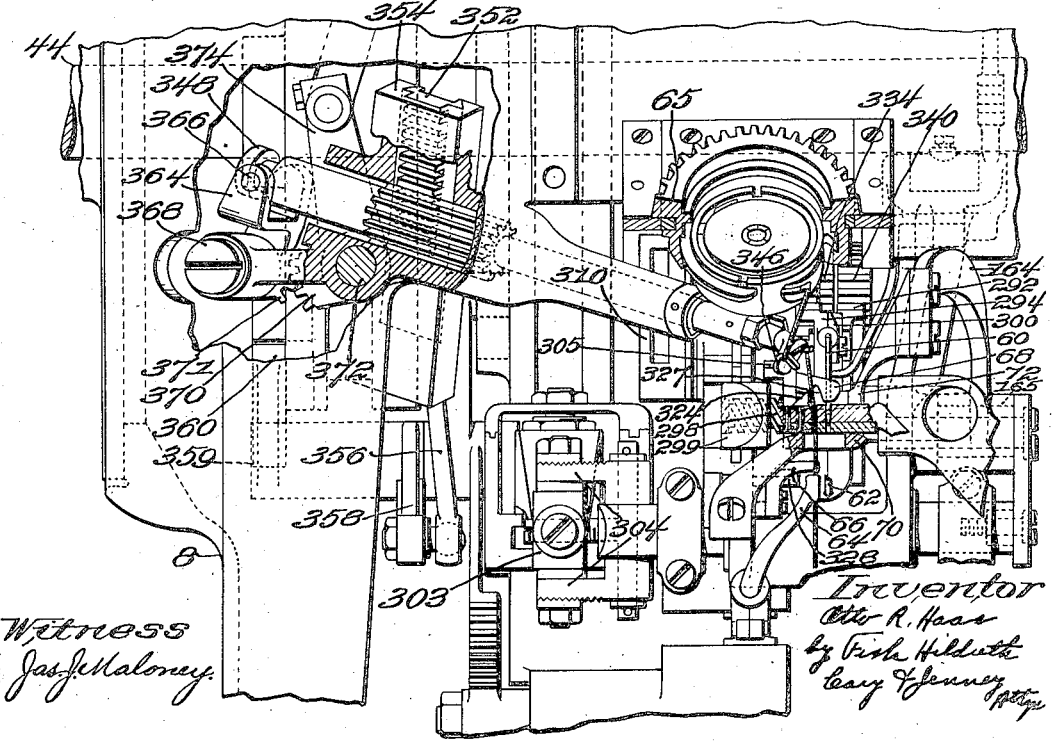

In the drawings, Fig. 1 is a view in side elevation of a machine including a base and sewing mechanism attached thereto, embodying the features of the present invention; Fig. 2 is a plan view of a portion of the mechanism within the base of the machine shown in Fig. 1; Fig. 3 is a view in side elevation on an enlarged scale, partly in section of the sewing mechanism of the machine; Fig. 4 is a view in front elevation on a still further enlarged scale, of the upper part of the sewing mechanism, parts of the casing being broken away; Fig. 5 is a view in rear elevation of the upper part of the sewing mechanism, partly broken away and shown in section; Fig. 6 is a plan view, partly in section, of the front part of the machine; Fig. 7 is a view in side elevation partly in section and partly broken away of the sewing mechanism, taken from the right hand side of the machine; Fig. 8 is a similar view looking from the left hand side of the machine; Fig. 9 is another view in side elevation as viewed from the right on a still further enlarged scale and partly in section, of parts of the machine including the thread cutter in the act of severing the thread; Fig. 10 is a view in rear elevation and in section of the thread cutter employed with the machine, taken along the line 10—10 of Fig. 9; Fig. 11 is a sectional plan view taken along the line 11—11 of Fig. 7; Fig. 12 is a perspective view of the thread cutter knife in separated relation to the bar for operating it; Fig. 13 is a sectional plan view of the thread cutter mechanism taken along the line 13—13 of Fig. 9; Fig. 14 is a view in elevation as viewed from the left, on the same scale as Fig. 7, showing the machine in stopping position with the thread cutter in the act of severing the thread; Fig. 15 is a plan view partly in section of the front part of the machine illustrating the locking thread measuring mechanism; Fig. 16 is a view in front elevation, partly broken away, of the same parts of the machine, the thread cutter mechanism having been removed; Fig. 17 is a plan view, partly in section, showing particularly the needle and awl actuating mechanisms; Fig. 18 is a view in side elevation and in section of the same parts of the machine taken from the right side, showing the loop of needle thread being drawn into the work; Fig. 19 is an enlarged view in elevation and partly in section of the stud on which the needle and awl segments of the machine are mounted and of the adjacent parts; Fig. 20 is a detail view in section of the needle and awl mounting stud and its oscillating segment; Fig. 21 is an end view of the needle and awl stud oscillating segment shown in Fig. 20; and Fig. 22 is a sectional view of the stud shown in Fig. 20, taken at right angles to the section shown in that figure.

The sewing machine embodying the present invention is substantially the same except as hereinafter described, as the machine of applicant's co-pending application Ser. No. 600,016, filed March 19, 1932, for Shoe sewing machines. The frame of the machine comprises a main base 2, a frame 4 containing the power driving mechanism and supporting a motor, the lower part of which is shown at 6, and a frame 8 supporting the sewing mechanism. The motor 6 drives the machine through a vertical shaft 10 arranged to rotate continuously while the motor is running. The mechanism in the base 2 and the sewing mechanism are driven from the continuously rotating shaft 10 through a clutch comprising a driving member 12, a driven member 14, and suitable gearing mounted within the frame.

The lasted shoe being operated upon is indicated at 16 and is supported upon a jack 18 mounted within the main base 2. The connections between the jack 18 and the base 2 are such that the shoe may be tipped and turned and fed laterally with respect to the sewing mechanism, to present the shoe properly thereto while mounted on the jack. These movements are controlled from a pattern cam shaft 20 having a series of cams 22. The cam shaft carries a gear 24 which is rotated through substantially a complete revolution during the operation on a single shoe. At the end of the sewing operation, a block 26 secured to the gear 24 engages a pawl 28 carrying a roll 29 (see Fig. 2). The roll is normally held in position by a spring 30 against the curved edge of a plate 31 fixed in the base 2, the spring 30 being stretched between the plate and the pivot for the roll. The pawl 28 is pivotally connected to a lever 32, which in turn is rotatably mounted on a shaft 34 in the main base 2. The roll 29 in moving outwardly under the action of the block 26 on the pawl 28, strikes the arm of a second lever 36 mounted upon a bolt 38 on the main base. The lever 36 actuates, during this movement, a link 40 to set in operation certain auxiliary mechanisms driven from the motor shaft 10 to complete the formation of a seam, sever the thread, release the shoe from the sewing devices, and return the jack to its original position. The operations performed by these auxiliary mechanisms include movement of the cam shaft 20 by the pawl 28. This movement is imparted through a link 42 connected to one arm of the lever 32 acting to move the pawl 28 into engagement with the end of the block 26 to complete the rotation of the cam shaft.

The sewing mechanism of the machine is operated from a sewing cam shaft 44 rotated from the driven clutch member 14 through a pair of meshing helical gears 46 and 48 attached to the clutch member and to the cam shaft, respectively. When it is desired to stop the machine, the driven clutch member 14 is disengaged from the driving clutch member 12 by a driving and stopping mechanism comprising in part a bell-crank 50 secured to a shaft 52 and rocked in a clockwise direction through the engagement of a bolt 54 on one arm of the bell-crank with a cam slot 55 in a sleeve attached to the driven clutch member 14. The return movement of the shaft 52 in a counter-clockwise direction is prevented by a latch 56 which engages the vertical arm of the bell crank and causes the clutch to be disengaged through the action of the cam slot 55 on the bolt 54.

The stitch-forming and work feeding devices of the machine include a curved hook needle 60, a curved awl 62, a looper 64, a shuttle or loop taker 65, a thread finger 66, a needle guide 68, a work support 70, a presser foot 72 and a feed slide 74 on which certain of the stitch-forming devices are carried. The stitch-forming devices operate with a continuous feeding movement to form a lockstitch seam and, at the end of the operation, the stopping mechanism including the bell-crank 50, the bolt 54 and the cam slot 55 in the driven clutch member 14 are arranged to bring the sewing mechanism to rest at a definite point with the needle and awl disengaged from the work.

The connections between the bell-crank 50 and the sewing mechanism include the shaft 52 on one end of which the bell-crank is secured, and a block 76 (see Figs. 4 and 5) attached to the other end of the shaft and coupled by means of a tongue and groove with a block 77 secured to one end of a stub shaft 78 loosely fulcrumed in the frame 8 of the sewing mechanism. The inner end of the stub shaft 78 is connected to devices for causing the looper to misloop the needle and to other devices for performing operations auxiliary to the sewing. All of the mechanisms thus briefly referred to, including the means for supporting the jack within the main base 2, are substantially the same as described in the above referred to application.

In the machine of applicant's co-pending application the sewing threads are severed at the end of a seam by the automatic operation of a curved thread cutting knife arranged to engage the tread surface of the shoe in cutting the threads, which knife is pivotally mounted directly upon the presser-foot.

In the embodiment of the present invention, a thread cutter is provided which is mounted upon a part of the machine separate from the presser-foot so that during the operation of the machine in sewing a seam, the thread cutter is located in a position remote from the sewing point and is not liable to interfere with the stitch-forming and other devices operating on the shoe or with the proper manipulation of the shoe. The thread cutter is so mounted that it may be moved bodily independently of the presser-foot from its position remote from the sewing point to a position where the knife of the thread cutter may be actuated to cut the thread.

The thread cutter comprises a straight knife 88 of substantially rectangular cross section sharpened at one end and arranged when moved longitudinally in its supporting carriage to engage the shoe at an angle to the tread surface of the sole in severing the thread (see Fig. 9). To support the thread cutter knife 88 for movement toward and from engagement with the work to sever the thread, the knife is mounted upon a rack bar 90. The knife is formed with a channel portion 92 at its upper end to embrace a rib 94 projecting from one side of the rack 90. The knife is also formed with a slot 96 through which a securing bolt 98, threaded into the rib 94, may pass for securing the knife to the rack. In order to maintain the knife in suitable adjusted position on the rack, the outer surface of the knife is serrated and a correspondingly faced washer 100 surrounding the bolt 98 cooperates with the serrations in the knife to hold it in place longitudinally. The rack 90 is mounted to slide at an acute angle with respect to the work in a carriage 102 and is formed with inclined rack teeth 104 meshing with a segmental gear 105 fixed to the lower end of a vertical shaft 106 rotatably mounted in the carriage. To prevent longitudinal movement of the shaft, a collar 107 is pinned to the shaft above its bearing in the carriage. At the end of the seam, after movement of the carriage into a position in which the knife may engage the work, the gear 105 is rotated first in one direction and then the other to project the knife against the work to cut the thread and then retract the knife. In its retracted position the knife 88 lies at one side of a protecting portion 108 projecting from the carriage 102 (see Fig. 7).

In order to move the thread cutter bodily toward and from the position where it may engage the work, as shown in Fig. 9 the carriage 102 is mounted to slide vertically in a guideway formed in a bracket 109 attached to the front of the machine by screws 110 and a bolt 112. Before the knife is actuated to cut the thread, the carriage is moved to a position in which the knife will engage the shoe sole at the proper point to sever the locking thread at the tread surface of the shoe and the needle thread below the lock, as described in the above application. Since the soles of different shoes are of different thicknesses, the position to which the carriage is moved must be controlled accordingly, and for this purpose a carriage positioning slide 114 is connected by a link 116 to the presser-foot 72. The presser-foot 72, as it engages the work at the end of the seam, holds the slide 114 in a position determined by the thickness of the work. The upper end of the slide is located in the path of a projection 122 extending laterally from the carriage 102 so that the slide limits the downward movement of the carriage and positions the thread cutting knife properly with respect to the upper surface of the shoe sole. The link 116 is connected at its ends to the presser-foot and the slide by means of ball and socket joints and, to enable the slide to be adjusted with relation to the presser-foot, an adjustable connection is provided between the link and the slide. As best shown in Fig. 9, this connection comprises a bolt 118 screw-threaded into the lower end of the slide, held in position by a lock nut 120, and having the ball of the joint at its lower end. To limit the movement of the slide, the slide is slotted along its rear edge and the head of a screw 121 projects from the frame of the machine into the slot.

In the illustrated machine, the thread cutter is operated to engage the work and to be moved toward and from a position where it may cut the thread through a positively operated cam disc 124 driven at the proper time from the motor shaft 10. The thread cutter actuating cam disc 124 is rotatably mounted on a fixed shaft 126 secured in a bracket 128 bolted to the top of the sewing frame and the cam disc 124 is formed with a pair of cam slots 130 and 132 respectively for shifting the carriage 102 toward and from the tread of the shoe, and for actuating the cutter knife 88 against the shoe and withdrawing it while the carriage is in shifted position. When rotated, the cam disc acts to shift the carriage through the operation of a lever 134 pivoted at its rearward end on a shaft 136 (see Fig. 7) fixed at the rear part of the bracket 128. The central part of the lever 134 carries a cam follower 138 engaging the cam slot 130. The forward end of the lever acts to shift the carriage and, when shifted, to lock the carriage in fixed position relative to the presser foot.

The conections between the actuating lever 134 and the thread cutter carriage for shifting the carriage toward and from the position of operation of the thread cutter comprise a link 140, pivotally connected at one end to the forward end of the lever 134 and, at its other end, to a vertical bar 142 sliding in a passage in the carriage. To limit the amount of free sliding movement in the carriage, the bar 142 is recessed at 144 and a projection 146 from the carriage extends within the recess. The bar 142 is normally locked to the carriage by a block 148 sliding at right angles to and in a recess between the bar 142 and the slide 114. The ends of the block 148 are wedge-shaped and in the uppermost position of the carriage one of the ends is in engagement with a notch 150 in the bar 142 and slidingly engages the surface of the slide 114 to lock the bar to the carriage. Upon downward movement of the bar and carriage to a position predetermined by the presser foot on the work, in which position the projection 122 on the carriage engages the upper end of the slide 114, the block 148 moves out of the notch 150 in the bar 142 and engages a notch 152 in the slide to lock the carriage while the thread cutter is being actuated. The bar 142 is then free to move in the carriage so that further movement of the lever 134 does not move the carriage, the block 148 sliding along the side of the bar. As the cam 124 completes its rotation, it moves the parts described in a reverse direction to unlock and retract the carriage 102 to its original raised position. The carriage is raised by the bar 142 when the lower end of the notch 144 in the bar engages the projection 146 on the carriage, at which time the notch 150 is opposite the block 148.

To actuate the thread cutting knife 88 toward and from the work while the thread cutter carriage is locked in lowered position, the thread cutter actuating cam disc 124 also drives a follower 154, (see Fig. 9) engaging the cam slot 132. The follower 154 is mounted at the upper end of a bar 156, slidably arranged in an oblique guideway 158 in the bracket 109 at the front of the machine. The lower end of the bar 156 is provided with rack teeth meshing with corresponding teeth 160 at the upper end of the vertical shaft 106. The cam slot 132 is so shaped that the shaft 106 will be rotated first in one direction and then the other, operating the gear 105 at the lower end of the shaft and the rack bar 90 toward and from the work while the carriage 102 is in stationary lowered position. The teeth 160 on the shaft 106 are of sufficient length to provide a driving connection between the rack bar 156 and the shaft 106 in any vertical position of the carriage 102.

At the time the sewing mechanism of the machine is brought to rest, the projecting edge of the shoe sole is held by the presser-foot which is locked in engagement with the sole by mechanism described in the application above referred to. The presser-foot is mounted on a lever 164, shown in Figs. 7 and 17, having an arm extending rearwardly from its fulcrum 165, and is actuated by a link 166 connected between the arm and a wedge block 168, a locking wedge block 170 cooperating with the wedge block 168 and a compression spring 172 surrounding a rod 173 connected to the locking wedge block 170 and arranged to maintain it in fixed position against the work by pressure of the spring between a collar on the rod and a portion of the base 2 in which the rod 173 slides.

The presser-foot 72 is unlocked and raised from engagement with the shoe sole after the operation of the thread cutting knife and while the carriage 102 is being raised to its original position, in substantially the same manner as in the machine of the application above referred to. However, in the present machine, the connections for releasing the presser-foot are operated by the carriage shifting cam lever 134 and include a link 174 pivotally connected at its upper end to the lever 134 and at its lower end to the arm of a lever 175 fulcrumed on the machine frame. The lever 175 operates a pawl 176 pivoted on the end of an arm 178 and connected to an arm of the lever 175 by a link 180. The pawl 176, during upward movement of the carriage 102, engages the upper surface of a projection 182 from the locking wedge block 170, causing the block to be thrust downwardly against the action of the spring 172, permitting the presser-foot to be released. The presser-foot when released from the action of the wedge blocks 168 and 170 is raised by a spring 184 connected between the presser-foot lever 164 and the machine frame. During the sewing operation of the machine, the pawl 176 idly engages one side of the projection 182 (see Fig. 7), so that the presser-foot may be released intermittently to permit normal feeding movement of the work along the seam. After the presser-foot is raised from the work at the end of the seam, the pawl 176 may be released from engagement with the projection 182 by shifting the pawl 176 laterally about its pivotal connection with the arm 178 as described in the application referred to above.

To cause the thread cutter cam disc 124 to be rotated at the end of a seam, the main driving clutch member 12 on the shaft 10 is formed with a helical gear portion meshing with a worm gear 188 (see Figs. 1 and 6) formed on a sleeve 190 rotating about a horizontal shaft 192 journalled in the power drive frame 4. The sleeve 190 also carries a gear 194 meshing with a gear 196 on a second horizontal shaft 198 journalled in the power drive frame. The gear 196 in turn drives a spur gear 200 fixed to one end of a short shaft 202 having a bearing in the power drive frame 4 and provided at its other end with a gear 204. The gear 204 being rotated continuously through the train of gears described, while the motor driven shaft 10 is rotated, drives a sleeve 206 journalled in an arm of the bracket 128 and formed at one end with a gear portion 208 meshing with the gear 204. The sleeve 206 is also provided with a hollow enlargement 210 and forms the driving part of a one-revolution Horton roll clutch of ordinary construction. The driven part of the clutch, indicated at 212, in the form of a sleeve (see Fig. 11) is mounted for rotation on the shaft 126, which shaft is supported at one end within a central opening in the sleeve 206 of the driving part of the clutch, and at the other end in a second arm of the bracket 128. The shaft 126 is held in place by a notched stud 213 slidingly arranged in the bracket 128 and clamped against the shaft by a nut 215 threaded on the outer end of the stud. The driven part of the clutch carries a collar 218 which, for convenience in assembly, is separately formed and keyed to the sleeve 212 to enclose a spring 214, one end of which is attached to the collar and the other end to a clutch controlling member 216 for causing the engagement of the clutch when released. The hub of the cam 124 for driving the thread cutter is coupled to the driven sleeve part 212 of the clutch by a tongue and groove connection 219 surrounded by a collar 220 which prevents separation of the assembled parts.

The clutch for operating the thread cutter cam disc 124 is engaged or disengaged according to the movement of an abutment 222 mounted upon a rod 224 (see Figs. 7 and 9). The rod 224 is secured to a block 226 fulcrumed on a shaft 228 in the sewing frame. The abutment 222 is normally drawn into engagement with the controlling member 216 of the clutch by a spring 232 stretched between a lever 234 carried by the block 226 and a stationary part of the machine, and cooperates with a projection 230 from the controlling member to bring the driven part of the clutch and the cam 124 to rest at a definite predetermined position. The lever 234 is pivotally mounted on the block 226 and at its upper end is provided with a ratchet portion 236 for engaging a correspondingly shaped portion on the periphery of the clutch spring collar 218, so that the spring 214 within the collar may not rotate the driven part of the clutch backwardly and cause engagement of the clutch while the abutment 222 engages the projection 230. The lower end of the lever 234 is formed with a lug 238 through which a set screw 240 passes and engages a stop portion of the block 226, so that when the spring acts to draw the ratchet portion 236 of the lever into engagement with the clutch, the screw 240 also causes the abutment 222 to engage the projection 230.

To engage the thread cutter clutch at the proper time, with respect to the position of the stitch-forming devices, the abutment 222 is withdrawn from the path of the projection on the clutch through connections actuated by the main sewing cam shaft 44. The spring 214 then acts to couple the continuously rotated clutch part 210 with the driven part 218 of the clutch in a well known manner. The connections for withdrawing the abutment 222 comprise a cam having a projection 242 at the proper position on the main sewing cam shaft 44 to operate, just before the cam shaft comes to rest, a lever 244 fulcrumed on a shaft 246. The outer end of the lever 244 is provided with an arm 248 and is tensed upwardly so that the inner end will yieldingly engage the cam on the cam shaft by a spring 250 connected between the arm and the machine frame. The arm 248 is arranged to cooperate with a projection 252 at the lower end of a link 254 connected at its upper end to the abutment supporting block 226 to cause the thread cutter clutch to be coupled.

Means is provided, substantially as in the machine of applicant's prior application for rendering the thread cutter clutch inoperative to drive the cam disc 124 through either of two different sets of connections, one set of connections being controlled by the pattern cam shaft and the other by the driving and stopping mechanism contained within the power driving frame 4. The first mentioned set of connections acts upon the upper end of the link 254 which is formed with an L-shaped slot 256 surrounding a screw 258 threaded into the block 226. During the sewing operation, the upper end of link 254 is moved forwardly of the machine by a spring 260 connected between the upper end of the link and the frame of the machine. When in this position, downward movement of the link will have no effect on the block 226 or on the abutment 222 for controlling the thread cutter clutch because the screw 258 is free to slide in the vertical portion of the slot. At the end of the sewing operation the upper end of the link is moved rearwardly by connections comprising a link 262 (see Figs. 1, 3, 5, and 7) pivotally connected between the upper end of the link 254 and one of a pair of off-set arms 263 secured to a shaft 264 fulcrumed in the sewing frame, a link 266 connected between the other of the arms 263 and a bell crank 268, and a link 270 connected at one end to the bell-crank 268, and at the other end to the lever 36 at the rear of the main base 2. When this lever is operated as hereinbefore described, by the pattern cam shaft 20, the connections just referred to act to shift the upper end of the link 254 against the action of the spring 260, so that the horizontal portion of the slot 256 engages the screw 258 and upon downward movement of the link 254, the abutment 222 will be disengaged from the clutch and the clutch coupled for one complete revolution of the cam 124 to operate the thread cutter.

The set of connections controlled by the stopping mechanism for rendering the thread cutter inoperative until the sewing mechanism is brought almost to rest, acts upon the lower end of the link 254 and comprises a link 272 connected at one end to the lower end of the link 254 and at the other end by a pivot 273 to the arm of a bell-crank 274 to form a toggle connection between the lower end of the link 254 and the shaft 246 upon which the bell-crank 274 is fulcrumed, a link 276 connected to the other arm of the bell-crank and at the other end provided with a pin 278 guided in a slot formed in a block 280, and a link 282 connected between the block 280 and an arm 284 (see Fig. 7) extending upwardly from the block 77. The toggle, comprising link 272 and an arm of the bell-crank 274, is maintained out of alinement by a spring 286 stretched between the lower end of the link 254 and a washer 288 surrounding the shaft 246. As the stopping mechanism begins to operate, the oscillation of the bell-crank 50 of the driving and stopping mechanism acts through the link 282 and the sliding block 280 to aline the toggle members and shift the lower end of the link 254 forwardly where it may be engaged by the arm 248.

The toggle link 272 and the arm of the bell-crank 274 are also arranged as in the machine of applicant's prior application, to prevent the thread cutter clutch from operating the thread cutter cam disc 124 through more than one revolution. To this end the pivot 273 connecting the link 272 with the bell-crank 274 is elongated beyond the point of connection with the toggle links so as to strike the lower end of a bracket 290 secured to the frame of the machine as the lever 244 is actuated at the end of a seam to draw the lower end of the link 254 downwardly. As the link 254 moves downwardly still further and retracts the abutment 222 from engagement with the clutch, the bracket 290 causes the toggle to be broken, and the spring 286 causes the lower end of the link 254 to be shifted out of operative relation with the arm 248 of the lever 244, thereby releasing the link 254 and permitting the spring 232 to return the abutment 222 into a position to be engaged by the projection 230 on the clutch before a complete revolution is accomplished. As the projection continues to rotate, it strikes the abutment 222 and the cam 124 is brought to rest.

The awl segment, indicated at 292 (see Figs. 14, 15, and 19), and the needle segment, indicated at 294, as in the machine of the application referred to, are mounted for movement in the line of feed independently of the feed slide 74 on which they are supported. These segments are separately oscillatable and are mounted with the needle and awl in fixed alinement on a carrier stud 296 having at one end a threaded portion 298 engaging a threaded bearing 299 formed in the slide 74. The needle is secured for convenient replacement on the segment 294 by a clamp member 300 between which and the segment there is provided a clamp releasing spring 301 (see Fig. 19). The other end of the stud 296 is supported in a plain bearing 302 in a fixed part of the machine frame 8 which bearing is engaged by the sleeve of the awl segment. Feeding movement of the feed slide is effected by the cam shaft through a cam lever 303 adjustably connected to the feed slide 74 by links 304. The stud with the needle and awl are independently movable in the line of feed relative to the feed slide 74, by rotation of the stud in the threaded bearing 299 through the engagement of a segment 305 extending from the stud with the teeth of a corresponding segment 306 fixed to a short horizontal shaft 308 in the front portion of the sewing frame. The shaft 308 is oscillated by an arm 310 secured to the other end of the shaft, the arm 310 being actuated through a link 312 connected between the arm 310 and one end of a lever 314 operated by a cam on the sewing cam shaft.

It is desirable that the carrier stud 296 on which the needle and awl segments oscillate be as short as possible while providing sufficient bearing areas to properly support the moving parts. The thread on the threaded portion 298 of the stud is, therefore, extended from the extreme end of the stud to the shoulder formed by the segment 305, and preferably the thread is of full depth up to this shoulder.

According to the construction illustrated in Figs. 20, 21, and 22, the segment 308 on the carrier stud is formed separately and secured to the carrier stud, in order that the thread on the threaded portion 298 of the stud may be accurate and of full depth. The stud 296 is reduced in diameter and is in the form of a bolt having its threaded journal portion 298 at one end, a thread at the other end to accommodate a nut 316, and an abrupt shoulder between the journal portion and the unthreaded portion. The segment 305 is formed with an extended sleeve portion surrounding the stud 296 throughout the entire length of the reduced portion, which sleeve provides support for the needle and awl segments. The stud 296 is connected for rotation with the segment 305 by a tongue 317 on the stud and a slot in the end face of the segment. The tongue 317 extends axially from the shoulder between the threaded portion 298 and the reduced bolt portion of the stud, so that when the nut 316 together with a washer 318 are applied to the stud, the tongue will be clamped within the slot in the segment, and the threaded portion extending beyond the segment will be of full depth to the end face of the segment.

In order to provide more space for the operating connections for the needle and awl segments, and to permit a greater movement of the needle, the needle guide which, in the machine of the application, was driven positively from a cam actuated part, in the present machine is driven from the needle segment 294 by friction. The needle guide is actuated positively by the thread finger 66 to cover the empty barb of the needle as soon as the thread has been withdrawn. The position of these segments has been reversed on the stud 296 from those in the machine of the application, in order that the needle guide may be located close to the thread finger. The needle segment 294, therefore, is disposed at the left hand side of the awl segment 292, and is formed with an arcuate inner surface 319, shown in Fig. 14, against which a shoe 320 mounted on the needle guide is compressed. A stud 321 extending upwardly from the shoe 320 engages a bore in an arm 322 of the needle guide, and compresses a coil spring 323 against the end of the bore. The frictional engagement produced by the spring between the shoe 320 and the surface 319 causes the needle guide to follow the movements of the needle until the needle guide contacts with a surface 324 on the presser-foot. Thereafter the needle guide remains stationary, and the needle continues its movement through the work.

The lowermost position of the needle guide by this construction is determined by the position of the presser-foot on the work. The stitch-forming devices which act to produce a continuous feed of the work are so timed that the presser-foot and work support will be back fed while the needle engages the work and while the needle guide supports the needle close to the surface of the work. As in the machine of the above identified application, the presser-foot is raised during sewing at the first portion of each back feeding movement by a cam actuated pawl 325 (see Fig. 7) engaging a ratchet portion of the presser-foot locking wedge block 170. In order to facilitate release of the presser-foot, the surface 324 of the presser-foot which the needle guide engages (see Figs. 16 and 19) is inclined at an angle, and a correspondingly inclined surface 327 on the needle guide permits the presser-foot to be raised with a minimum amount of interference with the needle guide as the presser-foot moves against the direction of feed and away from the needle guide.

During the retracting movement of the needle, the needle guide moves vertically away from the presser-foot until a stop arm 326 (see Figs. 14 and 18) on the needle guide engages a projection 328 extending laterally from a portion of the thread finger. The needle guide then remains stationary until the needle is fully retracted, and after the thread has been withdrawn from the barb of the needle, the thread finger is moved rearwardly by its actuating lever 329, causing the projection 328 on the thread finger to shift the needle guide over the barb of the needle, as shown in Fig. 18, so that the loop of needle thread in passing over the shuttle will not become entangled with the open barb. In order that the needle guide may not be carried beyond the end of the needle, a shoulder 331 is provided on the needle segment in a position to engage the end of the stop arm 326 on the needle guide.

To insure that the needle guide 68 will move with the needle and will not momentarily shift its position from covering the needle barb in spite of the action of the friction shoe 320 as the needle is accelerated in its movement towards the work, means is provided for actuating it positively during a part of the needle stroke. To this end the thread finger 66 is given a further short rearward stroke causing the needle guide to be accelerated as fast as the needle. The needle barb will thus remain covered until the needle guide strikes the presser-foot and the needle engages the work even though the machine is operated at extremely high speeds.

While the work support and presser-foot are being back-fed, as shown in Fig. 19, the needle, being in engagement with the work, is supported at its lower end against the frictional reaction of the work on the work support by the looper 64 which lays the thread within the barb of the needle before the work is released from the presser-foot. In laying the loop within the needle barb, the thread is first grasped by the thread finger 66, the looper then moving forwardly of the machine and against the direction of feed toward the needle, and then rearwardly of the machine around the needle and in the direction of feed to exert a strain on the needle. The strain is maintained throughout the entire back-feeding movement of the work support and presser-foot, so that the needle may not flex or become broken, and the distance between stitches in the work will be uniform.

To permit the use of a comparatively short geared portion on the needle segment, a pair of idler gears 330 and 332 (see Figs. 14 and 18) are rotatably mounted on bolts 333 secured on the feed slide 74 to mesh with the needle segment in either of its extreme positions. The idler gears 330 and 332 are driven by a segment 334 fulcrumed on a hollow shaft 336 in the frame of the machine, so that during the feeding movements of the feed slide and of the stud 296, the idler gears 330 may move in the line of feed relative to the segment 334, and the needle segment may also move relative to the idler gears in the feed slide. The segment 334 is oscillated by a cam follower 338 carried by an arm extending from the segment.

The awl segment is oscillated by means similar to that described in applicant's co-pending application consisting of a segment 340 at the end of a cam actuated lever 342 fulcrumed on a stationary shaft 344.

The thread extending between the shuttle and the work is manipulated at the proper time to draw off and measure thread from the shuttle in a sufficient amount to form the succeeding stitch. This operation is performed by a rotary thread measuring member 346 having fingers for grasping the thread, as illustrated in Figs. 4, 15, and 16. As described more particularly in the application referred to, the thread measuring member is mounted at the outer end of an inclined shaft 348 rotated by an elongated pinion 350 secured to the inner end of the shaft. The pinion 350 meshes with a rack 352 sliding in a guideway 254, and the rack is reciprocated by a cam on the sewing cam shaft through connections comprising a link 356 (see Fig. 3) connected at one end with a lever 358 fulcrumed on the machine at 359 having a gear segment 360 meshing with a corresponding segment 361 formed on a cam actuated arm 362. The other end of the link 356 is connected to the rack 352.

The thread measuring member 346 is also moved toward and from a position where it may grasp and measure thread so as not to interfere with the operation of the other stitch forming devices, and also may be moved slightly after grasping the thread to move it to one side of the needle and awl before releasing it. These movements are produced in the present machine by reciprocating the shaft 348 longitudinally by a bifurcated lever 364 embracing the grooved end of the shaft 348 and having pins 366 extending into the groove. The lever 364 is fulcrumed by a screw 368 threaded into the lever and passing loosely through a lug in the frame of the machine, and is operated by a gear segment 370 (Fig. 16) meshing with teeth 371 formed on the hub of the lever 364. The segment 370 oscillates on a screw 372 passing loosely through a lug in the machine frame and engaging at its threaded end the segment 370. The segment 370 is operated from the sewing cam shaft by an arm 374 extending upwardly from the segment 370, and having a cam follower at its end engaging a cam on the cam shaft. The movement of the thread measuring member 346 toward and away from a position where it may grasp the thread is, therefore, independent of its rotating movement and the thread, after being measured, may be retracted slightly as shown in Fig 16 to escape the needle as it moves into the work.

The shuttle 65 of the illustrated machine is similar to the shuttle of applicant's co-pending application, and is driven from the main sewing shaft 44 by a helical gear 376 (see Fig. 14) on the sewing shaft engaging a corresponding gear 377 fixed to the inner end of a second shaft 378 extending toward the front of the machine. The outer end of the second shaft carries a gear 380 meshing with gear teeth formed about the edge of the shuttle 65.

To prevent breakage of the driving connections between the sewing shaft and the shuttle, in the present embodiment of the invention, the gear 380 at the outer end of the shaft 378 is constructed in the form of a ring having a flange extending radially inwardly towards the center of the gear, as shown in Fig. 18. The ring is positioned at the end of the shaft 378 by a disk 382 at the end of the shaft fitting within a circular recess at one side of the flange. A plate 384 fits at the other side of the flange, and the parts are secured by screws 386 passing through the plate and the central opening in the ring gear and engaging the disk at their threaded ends. The force exerted by the screws ordinarily prevents rotation of the ring gear relative to the shaft 378, but in case of obstruction by thread jamming the shuttle or otherwise, the flange on the gear ring will slide between the plate and the disk without injuring the parts. The screws 386 are also readily accessible at the front of the machine adjacent the shuttle for readjusting the timing of the shuttle in case the gear is displaced.

The construction embodied in the present machine and herein described for supporting the needle and awl segments and the needle guide, the means for actuating the needle guide and its movements with relation to the needle, and also the arrangement by which the end of the needle is supported during its feeding movement by the action of the looper form the subject-matter of divisional application Serial No. 545, filed January 5, 1935. The new and improved thread measuring mechanism for measuring and controlling the locking thread embodied in the present machine, and therein described form the subject-matter of divisional application Serial No. 4,032, filed January 30, 1935.

The nature and scope of the invention having been indicated and a specific embodiment illustrating the several features of the invention having been described, what is claimed is:

1. An outsole shoe sewing machine having, in combination, stitch-forming devices, a work support and a presser-foot arranged to receive between them the projecting edge of the sole of a shoe, and means for severing the thread at the end of a seam while the shoe remains in position between the work support and the presser-foot, comprising a thread cutter arranged to engage the shoe in cutting the thread, and a movable carriage on which the thread cutter is mounted for moving the thread cutter toward and from a position where it may be operated to cut the thread.

2. An outsole shoe sewing machine, having, in combination, stitch-forming devices, a work support and a presser-foot arranged to receive between them the projecting edge of the sole of a shoe, means for severing the thread at the end of a seam while the shoe remains in position between the work support and the presser-foot comprising a thread cutter, a movable carriage on which the thread cutter is mounted for moving the thread cutter toward and from a position where it may be operated to cut the thread, and a connection between the carriage and the presser-foot for limiting the movement of the carriage toward the shoe according to the position of the presser-foot.

3. An outsole shoe sewing machine having, in combination, stitch-forming devices, a work support and a presser-foot arranged to receive between them the projecting edge of the sole of a shoe, means for severing the thread at the end of a seam while the shoe remains in position between the work support and the presser-foot comprising a thread cutter, a movable carriage on which the thread cutter is mounted for moving the thread cutter toward and from a position where it may be operated to cut the thread, a connection between the carriage and the presser-foot for limiting the movement of the carriage toward the shoe, and means for operating the cutter to sever the thread while the carriage remains stationary.

4. An outsole shoe sewing machine having, in combination, stitch-forming devices, a work support and a presser-foot arranged to receive between them the projecting edge of the sole of a shoe, means for severing the thread at the end of a seam while the shoe remains in position between the work support and the presser-foot comprising a thread cutter arranged to engage the shoe in cutting the thread, a movable carriage on which the thread cutter is mounted for moving the thread cutter toward and from a position where it may be operated to cut the thread, a slide connected to the presser-foot, a stop on the carriage for limiting the movement of the carriage toward the shoe according to the position of the slide, a lock for securing the carriage in the position determined by the stop, and means for operating the cutter relative to the carriage while the carriage remains locked in stationary position.

5. An outsole shoe sewing machine having, in combination, stitch-forming devices, a work support and a presser-foot arranged to receive between them the projecting edge of the sole of a shoe, means for severing the thread at the end of a seam while the shoe remains in position between the work support and the presser-foot, comprising a thread cutter arranged to engage the shoe in cutting the thread, a movable carriage on which the thread cutter is mounted for moving the thread cutter toward and from a position where it may be operated to cut the thread, a power driven connection for actuating the thread cutter to cut the thread after the carriage is moved into said position, and a separate connection for moving the thread cutter carriage.

6. An outsole shoe sewing machine having, in combination, stitch-forming and work feeding devices, a work support and a presser-foot arranged to receive between them the projecting edge of the sole of a shoe, means acting intermittently in timed relation to the work feeding devices for raising the presser-foot to permit the shoe to be presented progressively to the stitch-forming devices, a thread cutter, a movable carriage on which the thread cutter is mounted for moving the thread cutter toward and from a position where it may be operated to cut the thread at the end of the seam, and a connection between the presser-foot and the thread cutter carriage, normally inoperative during sewing, to position the carriage in fixed relation to the presser-foot when moved toward the shoe.

7. An outsole shoe sewing machine having, in combination, stitch-forming devices, a work support and a presser-foot arranged to receive between them the projecting edge of the sole of a shoe, means for severing the thread at the end of a seam while the shoe remains in position between the work support and the presser-foot, comprising a thread cutter arranged to engage the shoe in cutting the thread, a movable carriage on which the thread cutter is mounted for moving the thread cutter toward and from a position where it may be operated to cut the thread, means on the carriage for actuating the thread cutter to cut the thread, a power driven member mounted on the machine frame for operating said actuating means, and a connection between the power driven member and said actuating means permitting actuation of the thread cutter in the position to which the carriage is moved.

8. An outsole shoe sewing machine having, in combination, stitch-forming devices, a work support and a presser-foot arranged to receive between them the projecting edge of the sole of a shoe, means for severing the thread at the end of a seam while the shoe remains in position between the work support and the presser-foot, comprising a thread cutter arranged to engage the shoe in cutting the thread, a movable carriage on which the thread cutter is mounted for moving the thread cutter toward and from a position where it may be operated to cut the thread, means movable with the carriage for actuating the thread cutter to cut the thread, a power driven member mounted on the machine frame for actuating the movable means, a connection between the movable means and said power driven member permitting actuation of the cutter in any position of the carriage, and a separate power driven member for moving the carriage toward and from an operative position relative to the shoe, said power driven members being timed to actuate the cutter while the carriage is in operative position and to return the carriage to its original position after the thread has been cut.

9. An outsole shoe sewing machine having, in combination, stitch-forming devices, a work support and a presser-foot arranged to receive between them the projecting edge of the sole of a shoe, means for severing the thread at the end of a seam while the shoe remains in position between the work support and the presser-foot, comprising a thread cutter, a movable carriage on which the thread cutter is mounted for moving the thread cutter toward and from a position where it may be operated to cut the thread, a power driven member acting at the end of a seam to move the carriage into operative position and to raise the presser-foot from the shoe comprising a lever, connections between the lever and the thread cutter carriage and between the lever and the presser-foot to move the carriage into operative position upon movement of the lever in one direction and to raise the presser-foot and return the carriage to its original position upon movement of the lever to another position and another power operated member for actuating the thread cutter to cut the thread while the thread cutter carriage is in operative position.

10. An outsole shoe sewing machine having, in combination, stitch-forming devices, a work support and a presser-foot arranged to receive between them the projecting edge of the sole of a shoe, means for severing the thread at the end of a seam while the shoe remains in position between the work support and the presser-foot, comprising a thread cutter, a movable carriage on which the thread cutter is mounted for moving the thread cutter toward and from a position where it may be operated to engage the thread, an elongated pinion rotatably mounted on the carriage in alinement with the direction of carriage movement, a connection for actuating the thread cutter from the pinion, a reciprocating rack slidably mounted on the machine and arranged to mesh with the elongated pinion in all positions of the thread cutter carriage, and means for actuating the reciprocating rack to operate the thread cutter.

OTTO R. HAAS.